United States Patent
Jose et al.

(10) Patent No.: US 9,526,111 B2
(45) Date of Patent: Dec. 20, 2016

(54) CLEAR-TO-SEND SIGNALING TO LIMIT WIFI INTERFERENCE IN UNLICENSED SPECTRUM

(71) Applicant: QUALCOMM Incorporated, San Diego, CA (US)

(72) Inventors: Jubin Jose, Bound Brook, NJ (US); Junyi Li, Chester, NJ (US); Bo Tan, Bridgewater, CA (US); Assaf Touboul, Natanya (IL)

(73) Assignee: QUALCOMM Incorporated, San Diego, CA (US)

( * ) Notice: Subject to any disclaimer, the term of this patent is extended or adjusted under 35 U.S.C. 154(b) by 41 days.

(21) Appl. No.: 14/334,585

(22) Filed: Jul. 17, 2014

(65) Prior Publication Data

US 2016/0021679 A1  Jan. 21, 2016

(51) Int. Cl.
| | | |
|---|---|---|
| *H04W 72/12* | (2009.01) | |
| *H04W 72/04* | (2009.01) | |
| *H04W 74/00* | (2009.01) | |
| *H04W 84/12* | (2009.01) | |
| *H04W 16/14* | (2009.01) | |
| *H04W 74/08* | (2009.01) | |

(52) U.S. Cl.
CPC ..... *H04W 72/1278* (2013.01); *H04W 72/0453* (2013.01); *H04W 74/002* (2013.01); *H04W 16/14* (2013.01); *H04W 74/0816* (2013.01); *H04W 84/12* (2013.01)

(58) Field of Classification Search
None
See application file for complete search history.

(56) References Cited

U.S. PATENT DOCUMENTS

| | | |
|---|---|---|
| 7,046,650 B2 | 5/2006 | Sherman |
| 7,826,472 B2 | 11/2010 | Kappes et al. |
| 2002/0167960 A1* | 11/2002 | Garcia-Luna-Aceves H04L 12/43 370/442 |

(Continued)

FOREIGN PATENT DOCUMENTS

| | | |
|---|---|---|
| EP | 1059773 A2 | 12/2000 |
| WO | WO-2009021205 A2 | 2/2009 |

(Continued)

OTHER PUBLICATIONS

ISA/EPO, Partial International Search Report of the International Searching Authority, Int'l App. No. PCT/US2015/036986, Sep. 2, 2015, European Patent Office, Rijswijk, NL, 4 pgs.

(Continued)

*Primary Examiner* — Diane Lo
(74) *Attorney, Agent, or Firm* — Holland & Hart LLP

(57) ABSTRACT

Methods, apparatuses, systems, and devices are described for wireless communication in an unlicensed spectrum. In one method, a clear-to-send (CTS) signal may be employed to manage or otherwise limit potential interference for communications in the unlicensed spectrum. For example, communications using long term evolution (LTE) may employ an unlicensed spectrum, particularly for small cell deployment. In such case, the LTE communications may be protected from interference due to communications by other networks, such as WiFi, using the unlicensed spectrum.

29 Claims, 13 Drawing Sheets

(56) References Cited

U.S. PATENT DOCUMENTS

| | | | |
|---|---|---|---|
| 2005/0058151 A1 | 3/2005 | Yeh | |
| 2012/0164948 A1* | 6/2012 | Narasimha | H04W 72/1215 |
| | | | 455/63.1 |
| 2013/0016642 A1* | 1/2013 | Banerjea | H04L 27/2613 |
| | | | 370/311 |
| 2013/0100814 A1* | 4/2013 | Kennedy | H04W 72/1215 |
| | | | 370/236 |
| 2013/0208708 A1 | 8/2013 | Nezou et al. | |
| 2014/0038625 A1 | 2/2014 | Palanivelu et al. | |
| 2015/0312793 A1* | 10/2015 | Jeon | H04W 28/0205 |
| | | | 370/329 |
| 2015/0327297 A1* | 11/2015 | Nilsson | H04W 72/1215 |
| | | | 370/336 |
| 2016/0021664 A1* | 1/2016 | Chou | H04W 72/0453 |
| | | | 370/329 |

FOREIGN PATENT DOCUMENTS

| | | |
|---|---|---|
| WO | WO-2010021948 A1 | 2/2010 |
| WO | WO-2010024947 A1 | 3/2010 |

OTHER PUBLICATIONS

ISA/EPO, International Search Report and Written Opinion of the International Searching Authority, Int'l. App. No. PCT/US2015/036986, Nov. 16, 2015, European Patent Office, Rijswijk, NL, 17 pgs.

Ratasuk et al., "License-exempt LTE Deployment in Heterogeneous Network," 2012 International Symposium on Wireless Communication Systems (ISWCS), Paris, Aug. 28-31, 2012, pp. 246-250, ISBN: 978-1-4673-0761-1, Institute of Electrical and Electronics Engineers.

IPEA/EP, Second Written Opinion of the International Preliminary Examining Authority, Int'l App. No. PCT/US2015/036986, Aug. 5, 2016, European Patent Office, Rijswijk, NL, 11 pgs.

* cited by examiner

CLEAR-TO-SEND SIGNALING TO LIMIT WIFI INTERFERENCE IN UNLICENSED SPECTRUM

FIELD OF THE DISCLOSURE

The following relates generally to wireless communication, and more specifically to wireless communications in an unlicensed spectrum.

DESCRIPTION OF RELATED ART

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. Each base station has a coverage range, which may be referred to as the coverage area of the cell.

When a wireless communications system or network operates in a licensed spectrum, the system does not compete with other networks for use of the medium. However, when a system operates in an unlicensed spectrum, the system may experience unplanned interference from other unlicensed networks, such as WiFi networks.

SUMMARY

The described features generally relate to one or more improved systems, methods, and/or apparatuses for wireless communications in an unlicensed spectrum. More particularly, the described features relate to techniques for managing interference in an unlicensed or shared spectrum. In one example, a clear-to-send (CTS) signal is transmitted from a mobile device over a channel in an unlicensed radio frequency spectrum band. The CTS signal may be transmitted based on resource schedule information. For example, the resource schedule information may include scheduling for data communications and/or scheduling for CTS signals. Data may be received over the channel during a period of time set by the CTS signal. The CTS may include a time value that determines the period of time that other device refrain from transmitting over the channel. In some cases, the time value may be set based on the resource schedule information.

A method for wireless communications is described. According to one implementation, the method may involve transmitting a clear-to-send (CTS) signal from a mobile device over a channel in an unlicensed radio frequency spectrum band. Transmitting the CTS signal may be based at least in part on resource schedule information. The method also may involve receiving data over the channel during a period of time set by the CTS signal.

In some examples, the method may involve receiving the resource schedule information. The resource schedule information may include scheduling for transmitting the CTS signal. In such examples, the resource schedule information may include scheduling for transmitting another CTS signal by at least one other mobile device. The scheduling for transmitting the CTS signal may be quasi-static. Additionally or alternatively, the scheduling for transmitting the CTS signal may be dynamic. In some examples, transmitting the CTS signal may involve transmitting the CTS signal according to a duty cycle.

In some examples, the method may involve performing carrier sensing on the channel, the carrier sensing indicating that the channel is busy. In such examples, the method also may involve postponing transmitting the CTS signal until the carrier sensing indicates that the channel is idle.

In some examples, the method may involve operating the mobile device in a synchronous system. In such examples, the CTS signal may be configured to control WiFi interference.

In some examples, the data may be received over a backhaul link.

In some examples, the method may involve receiving a first CTS signal according to the resource schedule information. In such examples, transmitting the CTS signal may involve transmitting a second CTS signal in response to receiving the first CTS signal.

In some examples, the method may involve setting a time value of the CTS signal based at least in part on the resource schedule information.

An apparatus for wireless communications is described. According to one configuration, the apparatus may include means for transmitting a clear-to-send (CTS) signal from a mobile device over a channel in an unlicensed radio frequency spectrum band. Such transmitting of the CTS signal may be based at least in part on resource schedule information. The apparatus also may include means for receiving data over the channel during a period of time set by the CTS signal. The apparatus may include these and/or other elements configured to carry out various operations of the methods described above and herein.

Another apparatus for wireless communications is described. According to one configuration, the apparatus may include: a processor; memory in electronic communication with the processor; and instructions stored in the memory. The instructions may be executable by the processor to transmit a clear-to-send (CTS) signal from a mobile device over a channel in an unlicensed radio frequency spectrum band. Transmitting the CTS signal may be based at least in part on resource schedule information. The instructions may be executable by the processor to receive data over the channel during a period of time set by the CTS signal. The instructions may be executable by the processor to perform these and/or other various operations of the methods described above and herein.

Another method for wireless communications is described. According to one configuration, the method may involve: transmitting first data from a mobile device; transmitting a clear-to-send (CTS) signal over a channel in an unlicensed radio frequency spectrum band at an end of transmitting the first data; and, receiving second data over the channel during a period of time set by the CTS signal. In some examples, the CTS signal may be transmitted before the mobile device switches to a receive mode. Additionally or alternatively, the CTS signal may be transmitted according to resource schedule information. In some examples, transmitting the CTS signal may involve transmitting the CTS signal according to a duty cycle. The method may involve performing these and/or other various operations described herein.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
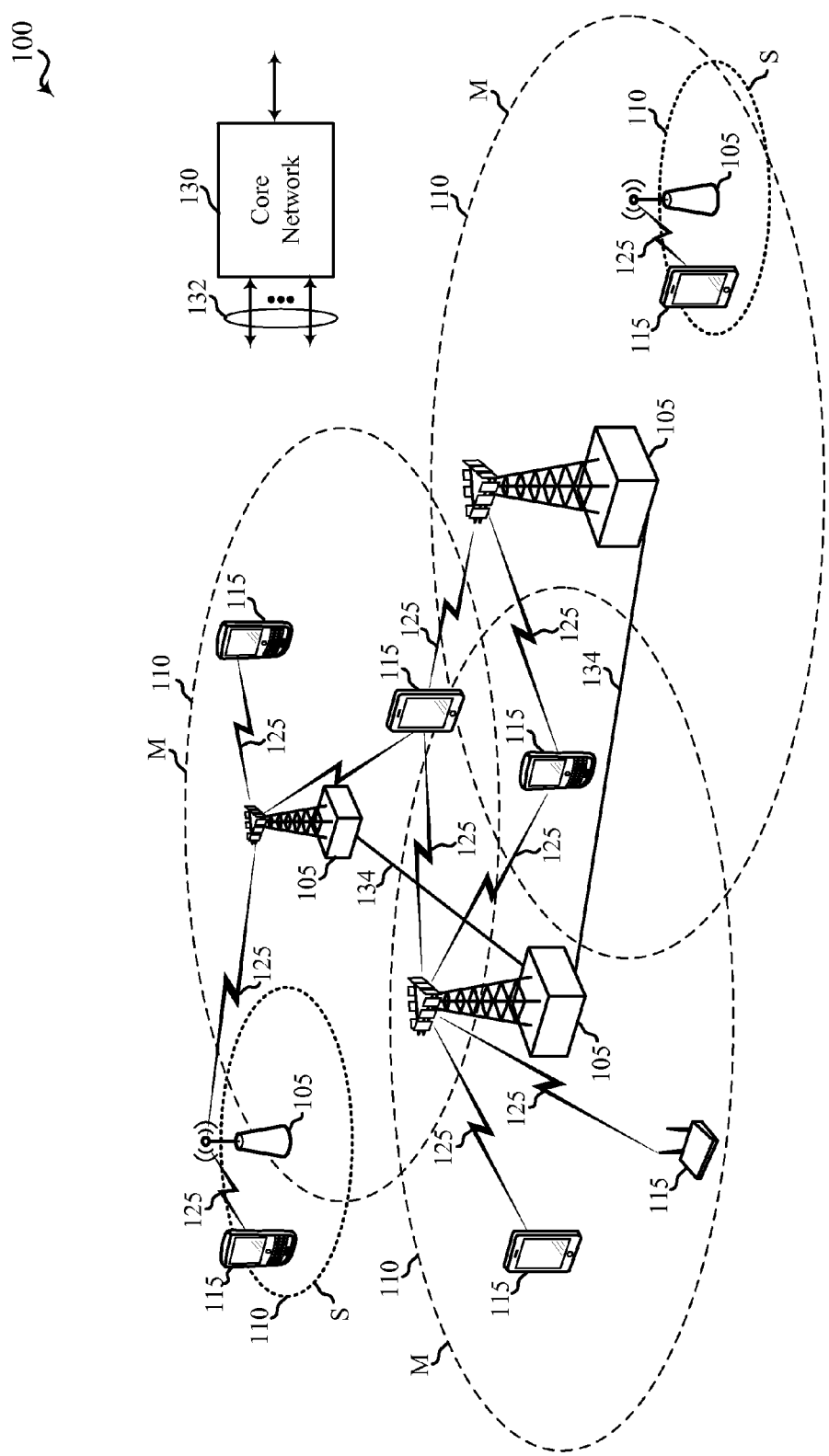
FIG. 1 shows a block diagram of a wireless communication system, in accordance with various aspects of the present disclosure.

Management of interference in an unlicensed spectrum is described. According to one implementation, deployment of a wireless communications system or network as a small cell (e.g., femtocell, picocell, etc.) may help solve capacity and/or coverage limitations for the overall cellular network. As not all small cells may be connected through a dedicated wired backhaul, a wireless backhaul may be used for the small cell. For example, a non-line-of-sight (NLOS) wireless backhaul may be used. Such an approach may simplify deployment and also may reduce infrastructure costs.

Expanding capacity and/or coverage of the cellular network through deployment of small cells, does not address the limited availability of licensed spectrum and the relatively high cost of operation (particularly, spectrum cost). Thus, the small cell may be configured to operate in an unlicensed spectrum, which is readily available at no additional cost. However, because the spectrum is unlicensed, the small cell may be subject to interference from other unlicensed networks, such as WiFi.

In order to manage interference from other unlicensed networks, the small cell may be configured to transmit clear-to-send (CTS) signals over a channel to manage interference in the unlicensed spectrum. The CTS signals may be transmitted in a format understood by WiFi radios. Because data traffic in a typical backhaul is relatively high and predictable, e.g., data transmissions often occurring back-to-back, a CTS signal may be transmitted at the end of a data transmission over the channel. The CTS signal may clear the channel for a subsequent data transmission or reception using the unlicensed spectrum.

Alternatively, wireless communication resources (e.g., time, frequency, etc.) may be assigned or scheduled for transmissions of the small cell (e.g., in a synchronous system). In such case, CTS signals may be transmitted in accordance with resource schedule information to protect the wireless communications of the small cell from interference. A CTS signal may be transmitted, by a wireless communication device operating in the small cell, before an anticipated reception by the device, for example. In some cases, the device may transmit a CTS signal in response to receiving a CTS signal from another device operating in the small cell. Such an approach may help to ensure the channel is clear in the vicinity of both devices (e.g., transmitting device and receiving device).

In some cases, the methods, apparatuses, systems, and devices described herein may provide operators of cellular networks (e.g., operators of Long Term Evolution (LTE) or LTE-Advanced (LTE-A) communications networks) with more opportunities to use a shared spectrum (e.g., a WLAN spectrum typically used for WiFi communications).

The techniques described herein are not limited to LTE, and may also be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or configuration set forth in the claims. Changes may be made in the function and arrangement of elements discussed without departing from the scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram of a wireless communication system 100 in accordance with various aspects of the present disclosure is shown. The wireless communication system 100 may include a plurality of access points (e.g., base stations, eNBs, or WLAN access points) 105, a number of user equipment (UEs) 115, and a core network 130. Some of the access points 105 may communicate with the UEs 115 under the control of a base station controller (not shown), which may be part of the core network 130 or certain access points 105 (e.g., base stations or eNBs) in various implementations. Some of the access points 105 may communicate control information and/or user data with the core network 130 through a backhaul 132. In some implementations, some of the access points 105 may communicate, either directly or indirectly, with each other over backhaul links 134, which may be wired or wireless communication links. The wireless communication system 100 may support operation on multiple carriers (waveform signals of different frequencies). Multi-carrier transmitters can transmit modulated signals simultaneously on the multiple carriers. For example, each communications link 125 may be a multi-carrier signal modulated according to various radio technologies. Each modulated signal may be sent on a different carrier and may carry control information (e.g., reference signals, control channels, etc.), overhead information, scheduling information, data, etc.

The access points 105 may wirelessly communicate with the UEs 115 via one or more access point antennas. Each of the access points 105 may provide communication coverage for a respective coverage area 110. In some implementations, an access point 105 may be referred to as a base station, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a WiFi node or some other suitable terminology. The coverage area 110 for an access point 105 may be divided into sectors (not shown) making up only a portion of the respective coverage area 110. The wireless communication system 100 may include access points 105 of different types (e.g., macro, micro, and/or pico base stations). The access points 105 may also utilize different radio technologies, such as cellular and/or WLAN radio access technologies. The access points 105 may be associated with the same or different access networks or operator deployments. The coverage areas 110 of different access points 105, including the coverage areas of the same or different types of access points 105, utilizing the same or different radio technologies, and/or belonging to the same or different access networks, may overlap. The coverage areas 110 may be considered to define cells, such as macro cells M and small cells S (e.g., femto cells, pico cells, etc.) as illustrated in FIG. 1. Although the small cells S are shown with only a single UE 115 within the respective coverage areas for simplicity, it should be understood that any number of UEs 115 may be within the coverage area of a small cell S.

In some implementations, the wireless communication system 100 may include an LTE/LTE-A communications system (or network), which LTE/LTE-A communications system may support one or more modes of operation or deployment scenarios for communicating using an unlicensed radio frequency spectrum band. In other implementations, the wireless communication system 100 may support wireless communication using a licensed spectrum and an access technology different from LTE/LTE-A. In LTE/LTE-A communications systems, the term evolved NodeB or eNB may be generally used to describe of the access points 105. The wireless communication system 100 may be a heterogeneous LTE/LTE-A/network in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via the backhaul 132 (e.g., S1 application protocol, etc.). The eNBs 105 may also communicate with one another, directly or indirectly, via backhaul links 134 (e.g., X2 application protocol, etc.) and/or via backhaul 132 (e.g., through core network 130). The wireless communication system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 may be dispersed throughout the wireless communication system 100, and each UE 115 may be stationary or mobile. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNBs, pico eNBs, femto eNBs, relays, and the like. A UE 115 may also be able to communicate over different access networks, such as cellular or other WWAN access networks, or WLAN access networks.

The communications links 125 shown in wireless communication system 100 may include uplinks for carrying uplink (UL) transmissions (e.g., from a UE 115 to an eNB 105) and/or downlinks for carrying downlink (DL) transmissions (e.g., from an eNB 105 to a UE 115). The UL transmissions may also be called reverse link transmissions, while the DL transmissions may also be called forward link transmissions. The downlink transmissions may be made using a licensed spectrum (e.g., LTE), an unlicensed spectrum, or both. Similarly, the uplink transmissions may be made using a licensed spectrum (e.g., LTE), an unlicensed spectrum, or both.

In some implementations of the wireless communication system 100, various deployment scenarios for the unlicensed spectrum may be supported, including a supplemental downlink mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., eNB) and a UE may take place in an unlicensed spectrum. Base stations or eNBs 105 as well as UEs 115 may support one or more of these or similar modes of operation. OFDMA communications signals may be used in the communications links 125 for LTE downlink transmissions in an unlicensed and/or a licensed spectrum, while SC-FDMA communications signals may be used in the communications links 125 for LTE uplink transmissions in an unlicensed and/or a licensed spectrum.

In some implementations of the wireless communication system 100, a small cell (e.g., femto cell, pico cell, etc.) may be configured to operate in an unlicensed spectrum (e.g., in the standalone mode) with a wireless backhaul. As discussed above, wireless communications of the small cell in the unlicensed spectrum may be subject to interference from other unlicensed networks, such as WiFi. Thus, the small cell(s) of the wireless communications system 100 may employ clear-to-send (CTS) signals to manage (e.g., limit) such interference.

Figure 2A:
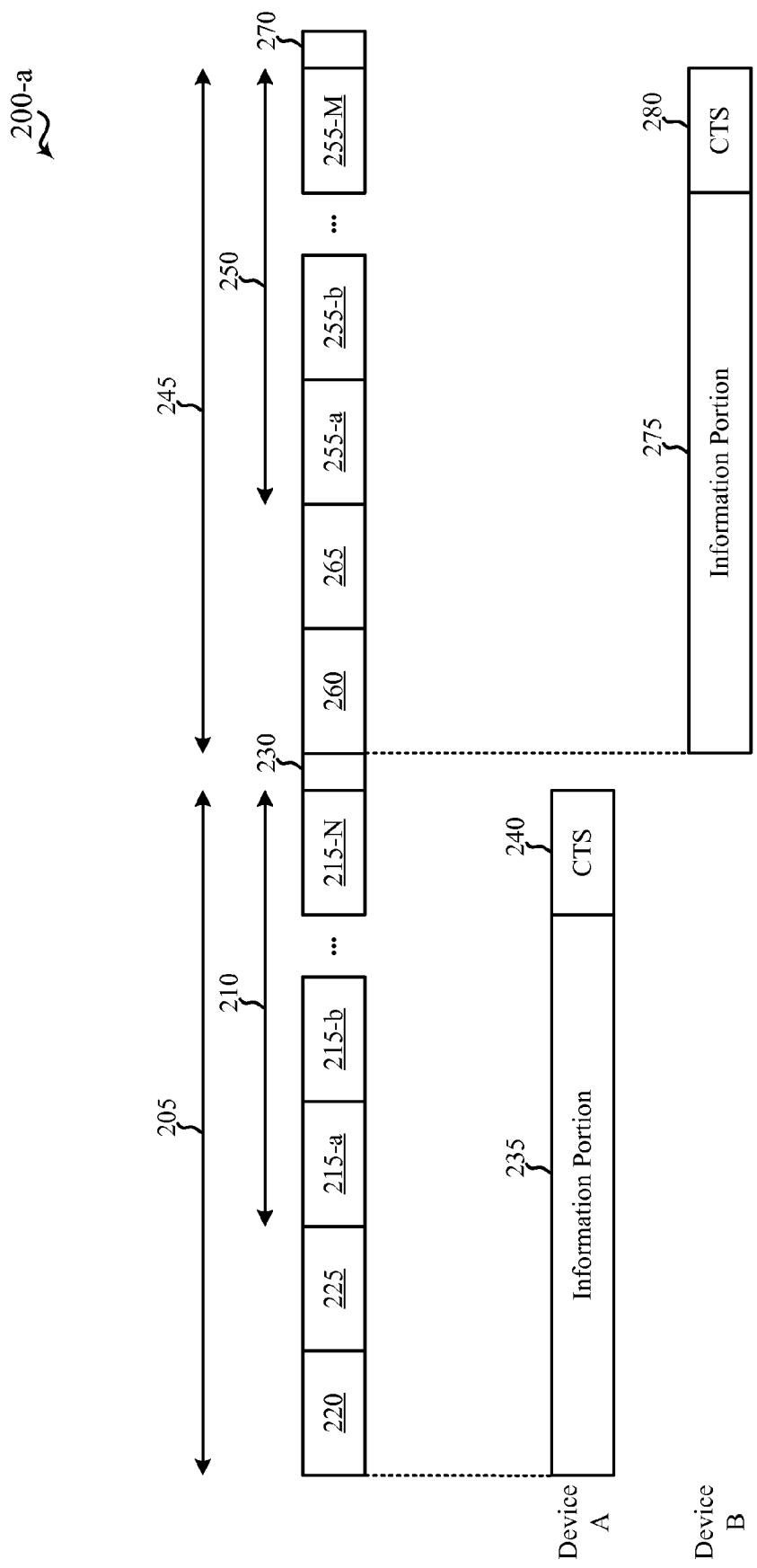
FIG. 2A shows a diagram that illustrates an example of a deployment scenario for using an unlicensed spectrum, in accordance with various aspects of the present disclosure.

FIG. 2A shows a diagram that illustrates an example of a deployment scenario for a small cell using an unlicensed spectrum, in accordance with various aspects of the present disclosure. In one implementation, FIG. 2A illustrates a wireless communication system 200-a illustrating communications over the unlicensed spectrum. The wireless communication system 200-a may be an example of portions of the wireless communication system 100 of FIG. 1, such as small cells S. Moreover, devices A and B may be examples of the base stations 105 of FIG. 1, the UEs 115 of FIG. 1, or a combination thereof.

FIG. 2A illustrates a sub-frame 205 that may be a downlink transmission from a base station 105 to a UE 115, for example. In such case, device A may be the base station 105. The sub-frame 205 may include various blocks of information, including a mini-frame 210 of a certain number of blocks 215-a, 215-b . . . 215-N that may be used for data packets, a block 220 for a preamble, and a block 225 for control information. In some cases, the sub-frame 205 also may include a trigger frame 230 to signal the end of the transmission (e.g., triggering a subsequent transmission).

According to the example shown, the transmission may include an information portion 235 (e.g., including a preamble, control information, and data packets) and a CTS signal 240 at the end of the transmission. Thus, the last block 215-N of the mini-frame 210 may be used for the CTS signal 240.

The CTS signal 240 may be a media access control (MAC) packet with a time value. Upon receiving the CTS signal 240, other devices may refrain from accessing the medium (e.g., the channel on which the CTS signal 240 is transmitted) for a duration set by the time value. The time value of the CTS signal 240 may be a predetermined value, for example, so that the CTS signal 240 protects a subsequent transmission of the wireless communication system 200-a from potential interference.

FIG. 2A also illustrates a sub-frame 245 that may be an uplink transmission from a UE 115 to a base station 105, for example. In such case, device B may be the UE 115. The sub-frame 245 may include various blocks of information, including a mini-frame 250 of a certain number of blocks 255-a, 255-b . . . 255-M that may be used for data packets, a block 260 for a preamble, and a block 265 for control information. In some cases, the sub-frame 245 also may include a trigger frame 270 to signal the end of the transmission (e.g., triggering a subsequent transmission).

According to the example shown, the transmission may include an information portion 275 (e.g., including a preamble, control information, and data packets) and a CTS signal 280 at the end of the transmission. Thus, the last block 255-M of the mini-frame 210 may be used for the CTS signal 280.

As with the CTS signal 240, the CTS signal 280 may be a MAC packet with a time value. The time value of the CTS signal 280 may be a predetermined value, for example, so that the CTS signal 280 protects a subsequent transmission of the wireless communication system 200-a from potential interference. In the example shown, the CTS signal 240 may have a time value that is configured to protect at least the information portion 275 for device B. In some cases, the CTS signal 240 may be transmitted before device A switches from a transmit mode to a receive mode, for example, to receive the information portion 275 of the subsequent transmission.

In some cases, the CTS signals 240, 280 may have time values such that the CTS signals 240, 280 cover a plurality of subsequent transmissions (e.g., multiple frames) of the wireless communication system 200-*a*. In such cases, a CTS signal may not be included at the end of every transmission. Further, in some cases, CTS signals may be transmitted according to a duty cycle such that a CTS signal is periodically transmitted at the end of transmissions of the wireless communication system 200-*a*.

In some cases, a CTS signal (not shown) also may be transmitted at a beginning of a transmission (e.g., sub-frame 205), such as when the transmission occurs after a period of time without a prior transmission including a CTS signal at the end to protect the transmission from potential interference.

Figure 2B:
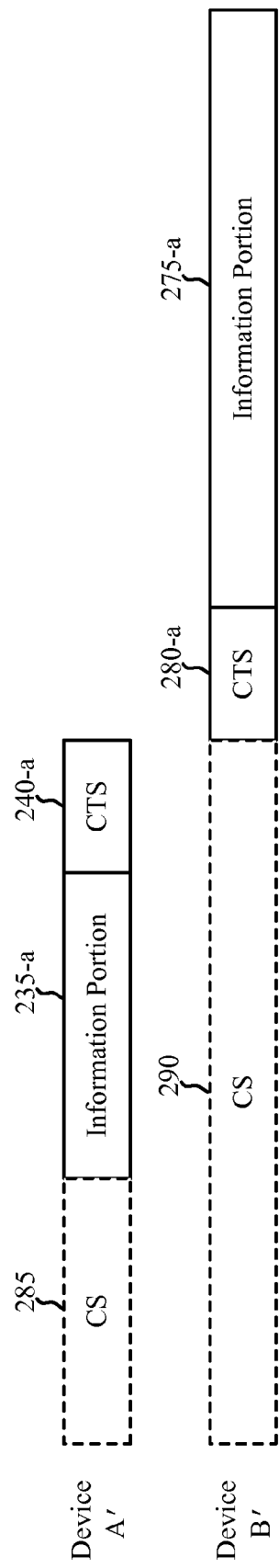
FIG. 2B shows a diagram that illustrates another example of a deployment scenario for using an unlicensed spectrum, in accordance with various aspects of the present disclosure.

FIG. 2B shows a diagram that illustrates another example of a deployment scenario for a small cell using an unlicensed spectrum, in accordance with various aspects of the present disclosure. In one implementation, FIG. 2B illustrates a wireless communication system 200-*b* illustrating communications over the unlicensed spectrum. The wireless communication system 200-*b* may be an example of portions of the wireless communication system 100 of FIG. 1, such as small cells S. Moreover, devices A' and B' may be examples of the base stations 105 of FIG. 1, the UEs 115 of FIG. 1, or a combination thereof.

FIG. 2B illustrates device A' performing carrier sensing (CS) 285 on a channel prior to transmitting on the channel. When device A' determines that the channel is free (e.g., changes from busy to idle), device A' may transmit an information portion 235-*a* followed by a CTS signal 240-*a*. In some cases, the information portion 235-*a* may be a shortened frame, with the CTS signal 240-*a* being followed by a full frame (not shown), e.g., a frame sufficient to include a remainder of the information not included in the shortened frame, that is protected by the CTS signal 240-*a*.

FIG. 2B also illustrates device B' performing CS 290 on the channel prior to transmitting on the channel. When device B' determines that the channel is free (e.g., changes from busy to idle), device B' may transmit a CTS signal 280-*a* followed by an information portion 275-*a*.

Alternatively, device B' may transmit the CTS signal 280-*a* and then receive the information portion 275-*a* from another device, such as device A'. In such case, device B' may not perform CS 290. In other words, device B' may perform CS 290 only when device B' is to transmit data.

Further, the CTS signal 240-*a* may protect the transmission in the vicinity (e.g., neighborhood) of device A' and the CTS 280-*a* may protect reception of the transmission in the vicinity of device B'. In some cases, device B' may transmit the CTS signal 280-*a* in response to receiving the CTS signal 240-*a* from device A'.

Figure 2C:
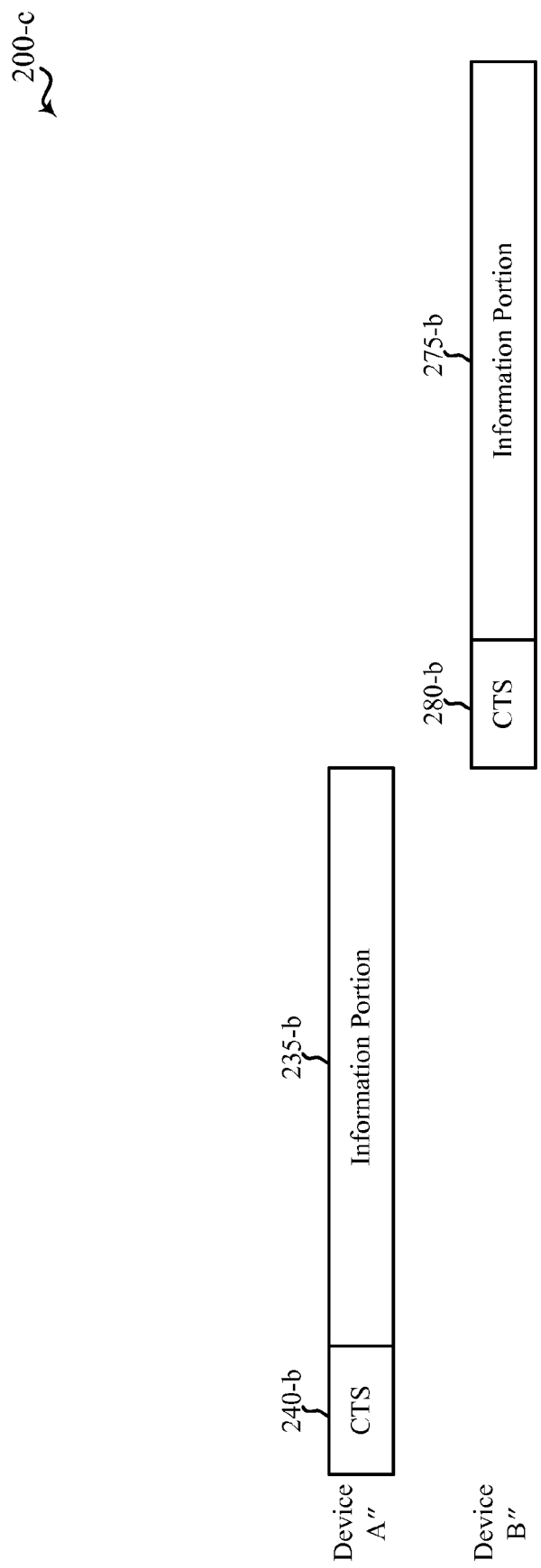
FIG. 2C shows a diagram that illustrates yet another example of a deployment scenario for using an unlicensed spectrum, in accordance with various aspects of the present disclosure.

FIG. 2C shows a diagram that illustrates yet another example of a deployment scenario for a small cell using an unlicensed spectrum, in accordance with various aspects of the present disclosure. In one implementation, FIG. 2C illustrates a wireless communication system 200-*c* illustrating communications over the unlicensed spectrum. The wireless communication system 200-*c* may be an example of portions of the wireless communication system 100 of FIG. 1, such as small cells S. Moreover, devices A" and B" may be examples of the base stations 105 of FIG. 1, the UEs 115 of FIG. 1, or a combination thereof.

FIG. 2B illustrates device A" transmitting a CTS signal 240-*b* before transmitting (or receiving) an information portion 235-*b*. Similarly, FIG. 2B illustrates device B" transmitting a CTS signal 280-*b* before transmitting (or receiving) an information portion 275-*b*.

When the wireless communication system 200-*c* is synchronous, wireless communication resources may be scheduled and the devices of the system 200-*c* (e.g., devices A" and B") may transmit and/or receive data in accordance with the scheduling. A base station 105 of the system 200-*c* may be configured as a resource scheduler and may provide resource schedule information to the devices of the system 200-*c*, either directly or indirectly via another device of the system 200-*c*. The resource schedule information may be transmitted as part of a data transmission (e.g., as part of control information in blocks 225, 265 in FIG. 2A) or separately, as appropriate or desired.

Device A" may transmit the CTS signal 240-*b* based on the scheduling of a transmission or reception of the information portion 235-*b*, and device B" may transmit the CTS signal 280-*b* based on the scheduling of a transmission or reception of the information portion 275-*b*. Alternatively, the resource schedule information may include scheduling of the CTS signals in addition to the scheduling of data exchanges.

In some cases, the time values of the CTS signals 240-*b*, 280-*b* may be a predetermined value, for example, set by the resource scheduler. In other cases, the time values of the CTS signals 240-*b*, 280-*b* may be set to cover transmission/reception of the respective information portions 235-*b*, 275-*b*, either set by the resource scheduler or by the individual devices A", B". In still other cases, the time values of the CTS signals 240-*b*, 280-*b* may be set to cover a plurality of communications of the wireless communication system 200-*c*. In some cases, the CTS signals may be scheduled to be transmitted periodically, for example, in accordance with a duty cycle to cover periods of time during which communications of the system 200-*c* are performed.

It should be understood that the various features described above with respect to FIGS. 2A, 2B and/or 2C may be combined to achieve other deployment scenarios as well. Thus, the deployment scenarios described above are intended to be illustrative and not exhaustive.

Figure 3A:
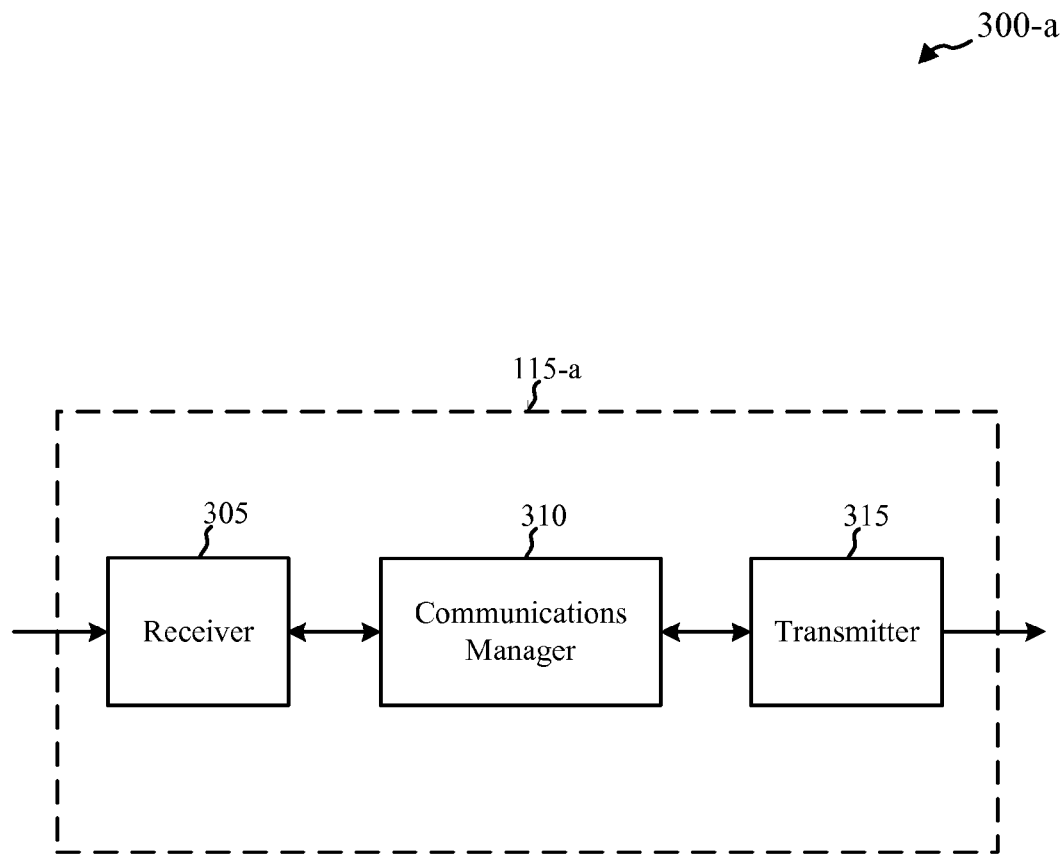
FIG. 3A shows a block diagram of an example of an apparatus that may be used for wireless communications in an unlicensed spectrum, in accordance with various aspects of the present disclosure.

FIG. 3A shows a block diagram 300-*a* of an apparatus 115-*a* for use in wireless communication in an unlicensed spectrum, in accordance with various aspects of the present disclosure. In some implementations, the apparatus 115-*a* may be an example of various aspects of the UEs 115 described with reference to FIG. 1. The apparatus 115-*a* may also be a processor. The apparatus 115-*a* may include a receiver 305, a communications manager 310, and/or a transmitter 315. Each of these components may be in communication with each other.

The components of the apparatus 115-*a* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some implementations, the receiver 305 may be or include a radio frequency (RF) receiver, such as an RF receiver operable to receive transmissions in a first radio frequency spectrum band and/or a second radio frequency spectrum band. In some cases, the first radio frequency spectrum band may be a licensed radio frequency spectrum band (e.g., an LTE/LTE-A radio frequency spectrum band)

and/or the second radio frequency spectrum band may be an unlicensed radio frequency spectrum band. In some cases, the receiver 305 may include separate RF receivers for the first radio frequency spectrum band and the second radio frequency spectrum band. The receiver 305 may be used to receive various types of data and/or control signals (e.g., transmissions) over communication link(s) (e.g., physical channels) of a wireless communication system including the first radio frequency spectrum band and/or the second radio frequency spectrum band, such as communication links of the wireless communication system 100 described with reference to FIG. 1.

In some implementations, the transmitter 315 may be or include an RF transmitter, such as an RF transmitter operable to transmit in the first radio frequency spectrum band and/or the second radio frequency spectrum band. In some cases, the transmitter 315 may include separate RF transmitters for the first radio frequency spectrum band and the second radio frequency spectrum band. The transmitter 315 may be used to transmit various types of data and/or control signals (e.g., transmissions) over communication link(s) (e.g., physical channels) of a wireless communication system, such as communication links of the wireless communication system 100 described with reference to FIG. 1.

In some implementations, the communications manager 310 may be used to manage wireless communication over the first radio frequency spectrum band and/or the second radio frequency spectrum band. For example, the communications manager 310 may be used to manage wireless communication in a supplemental downlink mode and/or a carrier aggregation mode using the first radio frequency spectrum band and the second radio frequency spectrum band, and/or in a standalone mode of operation using the second radio frequency spectrum band.

In some implementations, the communications manager 310 may be configured to implement an interference management scheme for communications over an unlicensed spectrum (e.g., the second radio frequency spectrum band). The interference management scheme may involve the communications manager 310 transmitting CTS signals via the transmitter 315 to protect communications of the system 100 in the unlicensed spectrum. The communications manager 310 may be configured to determine when to transmit a CTS signal and may be configured to set a time value for the CTS signal to be transmitted (e.g., to cover a desired number of communications or a desired period of time).

In some cases, the communications manager 310 may cause the transmitter 315 to transmit a CTS signal at the end of a data transmission. Additionally or alternatively, the communications manager 310 may cause the transmitter 315 to transmit a CTS signal before transmitting and/or receiving data. In some cases, the communications manager 310 may cause the transmitter 315 to transmit a CTS signal at the end and/or beginning of only some transmissions and/or receptions. For example, the communications manager 310 may cause the transmitter 315 to transmit CTS signals according to a duty cycle.

Figure 3B:
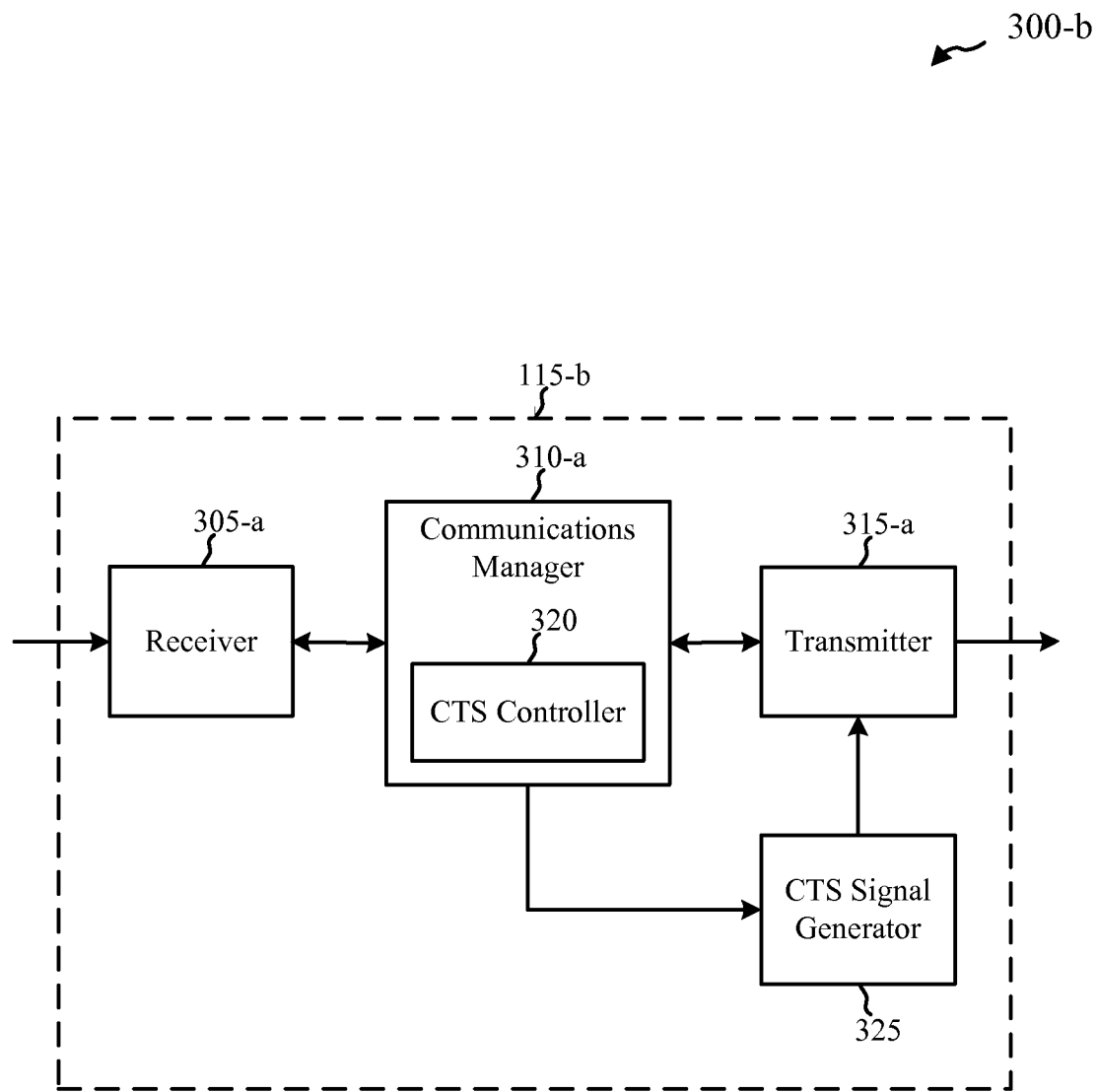
FIG. 3B shows a block diagram of another example of an apparatus that may be used for wireless communications in an unlicensed spectrum, in accordance with various aspects of the present disclosure.

FIG. 3B shows a block diagram 300-b of an apparatus 115-b for use in wireless communication in an unlicensed spectrum, in accordance with various aspects of the present disclosure. In some implementations, the apparatus 115-b may be an example of various aspects of the apparatus described above with reference to FIG. 3A and/or the UEs 115 described with reference to FIG. 1. The apparatus 115-b may also be a processor. The apparatus 115-b may include a receiver 305-a, a communications manager 310-a, and/or a transmitter 315-a. Each of these components may be in communication with each other.

The components of the apparatus 115-b may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some implementations, the receiver 305-a and the transmitter 315-a may be configured similarly to the receiver 305 and the transmitter 315, respectively, as described above with reference to FIG. 3A.

In some implementations, the communications manager 310-a may be configured to perform similar operations as the communications manager 310 described above with reference to FIG. 3A. Further, the communications manager 310-a may include a CTS controller 320 that is configured to control a CTS signal generator 325. The communications manager 310-a thus may be configured to implement an interference management scheme for communications over an unlicensed spectrum using the CTS controller 320.

In conjunction with managing communications (transmissions and/or receptions) of the apparatus 115-b, the communications manager 310-a may determine CTS signals to support the communications by limiting interference in the unlicensed spectrum. The communications manager 310-a may be configured to determine when to transmit CTS signals and may be configured to set a time value for the CTS signal to be transmitted. When to transmit CTS signals and the time value(s) of the CTS signals may be determined in accordance with the communications to be performed by the apparatus 115-b.

The communications manager 310-a may operate the CTS controller 320 to cause the CTS signal generator 325 to generate CTS signals with the determined time values. Then the communications manager 310-a may cause the transmitter 315 to transmit the generated CTS signals in accordance with the communications being performed by the apparatus 115-b. In such manner, the communications manager 310-a may implement various aspects of the deployment scenarios described above with respect to FIGS. 2A, 2B and/or 2C.

Figure 3C:
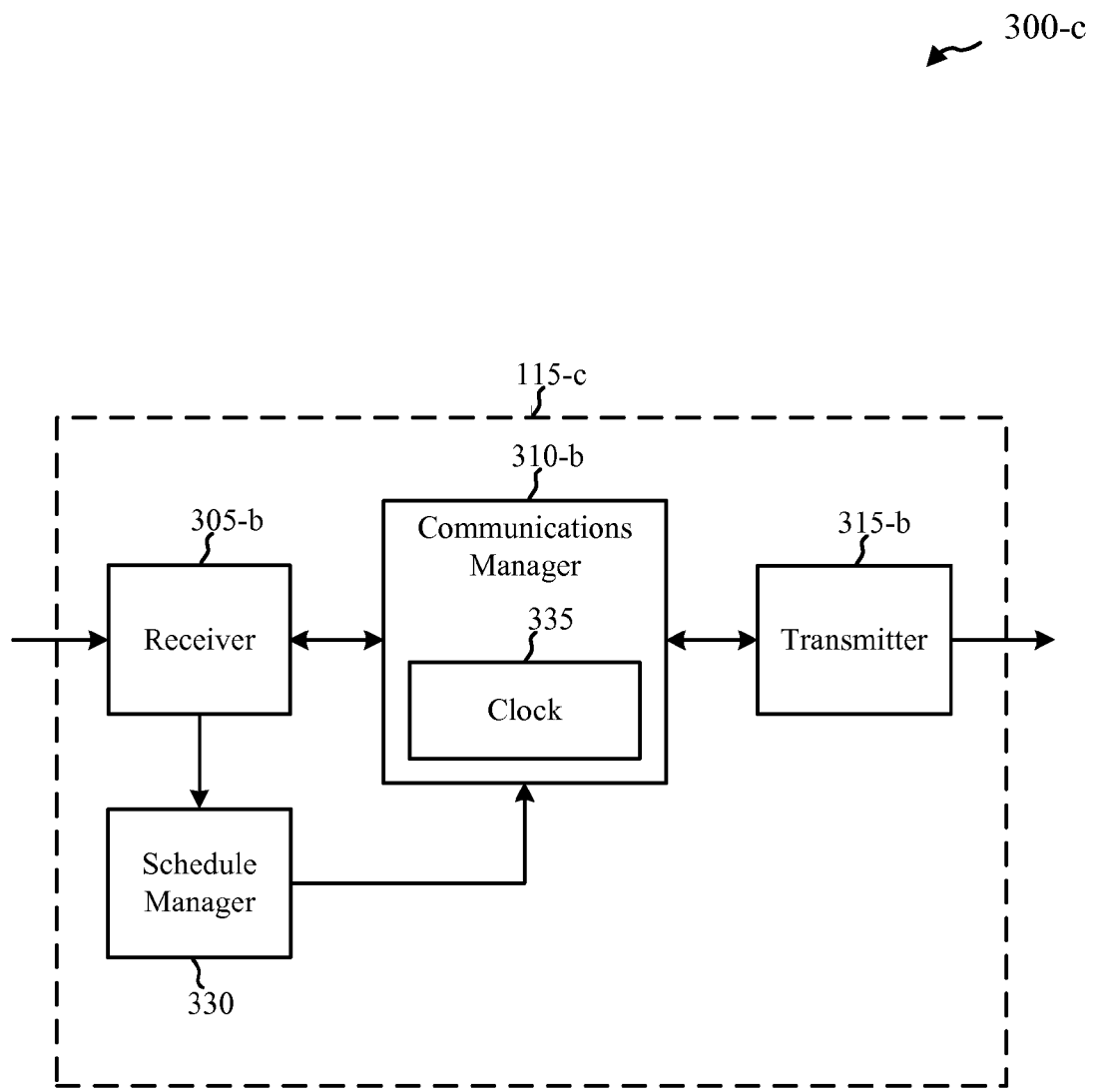
FIG. 3C shows a block diagram of yet another example of an apparatus that may be used for wireless communications in an unlicensed spectrum, in accordance with various aspects of the present disclosure.

FIG. 3C shows a block diagram 300-c of an apparatus 115-c for use in wireless communication in an unlicensed spectrum, in accordance with various aspects of the present disclosure. In some implementations, the apparatus 115-c may be an example of various aspects of the apparatus described above with reference to FIGS. 3A and/or 3B, and/or the UEs 115 described with reference to FIG. 1. The apparatus 115-c may also be a processor. The apparatus 115-c may include a receiver 305-b, a communications manager 310-b, and/or a transmitter 315-b. Each of these components may be in communication with each other.

The components of the apparatus 115-c may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some implementations, the receiver 305-b and the transmitter 315-b may be configured similarly to the receiver 305 and the transmitter 315, respectively, as described above with reference to FIG. 3A.

In some implementations, the communications manager 310-b may be configured to perform similar operations as the communications manager 310 described above with reference to FIG. 3A and/or the communications manager 310-a described above with reference to FIG. 3B. The apparatus 115-c also may include a schedule manager 330 and the communications manager 310-b may include a clock 335.

The schedule manager 330 may be configured to determine and implement scheduling for data communications of the apparatus 115-c. For example, the schedule manager 330 may be configured to obtain scheduling (e.g., resource schedule information) for communications from another device of the system 100 (e.g., a base station 105 including a resource scheduler) via the receiver 305-b. As noted above, resource schedule information may be received as part of a data communication (e.g., in a control information block), or may be received as a separate network communication. In some cases, the resource schedule information may include scheduling for CTS signal transmissions in addition to the scheduling for data communications.

The communications manager 310-b may use the clock 335 to perform data communications of the device (via the transmitter 315-b and/or the receiver 305-b) according to the scheduling provided from the schedule manager 330. The communications manager 310-b may determine CTS signals to support the scheduled communications and may cause the transmitter 315-b to transmit the CTS signals to limiting interference for the scheduled communications. When the resource schedule information includes scheduling for CTS signal transmissions, the communications manager 310-b may cause the transmitter 315-b to transmit CTS signals according to the schedule determined by the schedule manager 330 rather than based on the data communications of the apparatus 115-c.

The scheduling of the CTS signals may be dynamic or quasi-static. For example, the scheduling of the CTS signals may be dynamically updated based on the data communications of the wireless communication system 100 to be performed. Specifically, a CTS signal may be scheduled from a wireless device prior to scheduled data reception. The scheduling of CTS signals may be derived from data scheduling or may be explicitly signaled. Alternatively, the CTS signals may be scheduled according to a duty cycle, with the duty cycle being updated periodically based on the data communications to be performed (e.g., traffic volume). Such quasi-static scheduling of CTS signals may reduce the overhead associated with signaling CTS schedules.

Figure 3D:
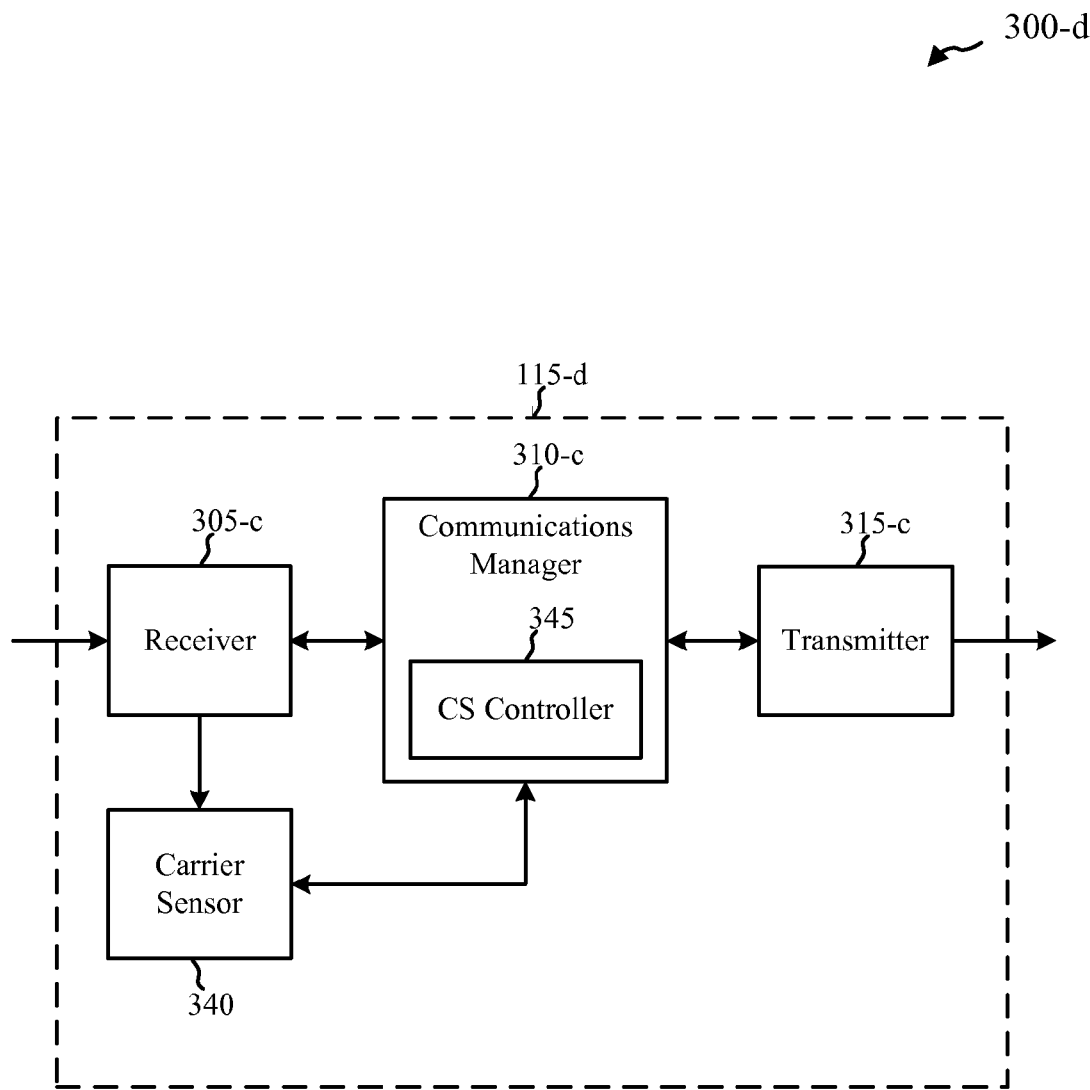
FIG. 3D shows a block diagram of still another example of an apparatus that may be used for wireless communications in an unlicensed spectrum, in accordance with various aspects of the present disclosure.

FIG. 3D shows a block diagram 300-d of an apparatus 115-d for use in wireless communication in an unlicensed spectrum, in accordance with various aspects of the present disclosure. In some implementations, the apparatus 115-d may be an example of various aspects of the apparatus described above with reference to FIGS. 3A, 3B and/or 3C, and/or the UEs 115 described with reference to FIG. 1. The apparatus 115-d may also be a processor. The apparatus 115-d may include a receiver 305-c, a communications manager 310-c, and/or a transmitter 315-c. Each of these components may be in communication with each other.

The components of the apparatus 115-d may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some implementations, the receiver 305-c and the transmitter 315-c may be configured similarly to the receiver 305 and the transmitter 315, respectively, as described above with reference to FIG. 3A.

In some implementations, the communications manager 310-c may be configured to perform similar operations as the communications manager 310 described above with reference to FIG. 3A, the communications manager 310-a described above with reference to FIG. 3B, and/or the communications manager 310-b described above with reference to FIG. 3C. The apparatus 115-d also may include a carrier sensor 340 and the communications manager 310-c may include a CS controller 345.

The carrier sensor 340 may be configured to determine whether a channel is busy (current traffic) or idle (free/available) based on information from the receiver 305-c. Any suitable carrier sensing technique may be employed. The communications manager 310-c may operate the CS controller 345 to implement carrier sensing by the carrier sensor 340 as appropriate or desired for data communications to be performed by the apparatus 115-d. For example, the communications manager 310-c may be configured to implement carrier sensing for a channel prior to transmitting a CTS signal and/or data on the channel. As described above with respect to the deployment scenario illustrated in FIG. 2B, the communications manager 310-c may hold off transmitting data on a channel until the carrier sensor 340 senses that the channel is idle. Then, the communications manager 310-c may cause the transmitter to transmit data followed by a CTS signal. Alternatively or additionally, the communications manager 310-c may hold off transmitting a CTS signal on a channel until the carrier sensor 340 senses that the channel is idle. Then, the communications manager 310-c may cause the transmitter to transmit a CTS signal followed by data.

Figure 4:
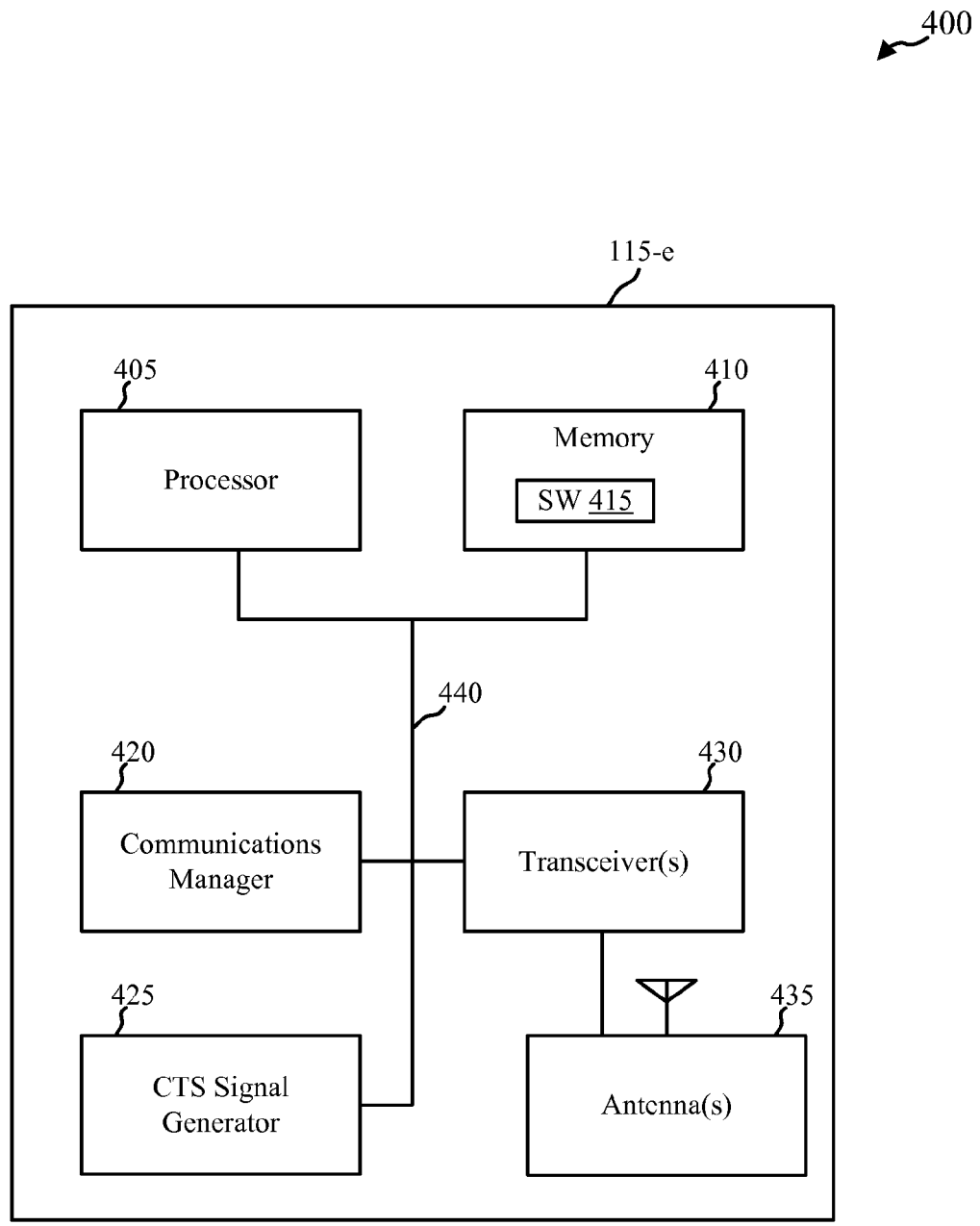
FIG. 4 shows a block diagram illustrating an example of an architecture for a UE configured for wireless communications in an unlicensed spectrum, in accordance with various aspects of the present disclosure.

FIG. 4 shows a block diagram 400 of an example of an architecture for a UE 115-e configured for wireless communications in an unlicensed spectrum a UE, in accordance with various aspects of the present disclosure. The UE 115-e may have various configurations and may be included or be part of a personal computer (e.g., a laptop computer, netbook computer, tablet computer, etc.), a cellular telephone, a PDA, a digital video recorder (DVR), an internet appliance, a gaming console, an e-reader, etc. The UE 115-e may in some cases have an internal power supply (not shown), such as a small battery, to facilitate mobile operation. In some embodiments, the UE 115-e may be an example of various aspects of the apparatuses 115-a, 115-b, 115-c and/or 115-d described with reference to FIGS. 3A, 3B, 3C and/or 3D, and/or the UEs 115 described with reference to FIG. 1. The UE 115-*e* may be configured to implement at least some of the features and functions described with reference to FIGS. 1, 2A, 2B, 2C, 3A, 3B, 3C and/or 3D. The UE 115-*e* may be configured to communicate with a base station 105 described with reference to FIG. 1.

The UE 115-*e* may include a processor 405, a memory 410, a communications manager 420, a CTS signal generator 425, at least one transceiver 430, and/or at least one antenna 435. Each of these components may be in communication with each other, directly or indirectly, over a bus 440.

The memory 410 may include random access memory (RAM) and/or read-only memory (ROM). The memory 410 may store computer-readable, computer-executable software (SW) code 415 containing instructions that are configured to, when executed, cause the processor 405 to perform various functions described herein for communicating over a an unlicensed radio frequency spectrum band. Alternatively, the software code 415 may not be directly executable by the processor 405 but be configured to cause the UE 115-*e* (e.g., when compiled and executed) to perform various of the functions described herein.

The processor 405 may include an intelligent hardware device, e.g., a CPU, a microcontroller, an ASIC, etc. The processor 405 may process information received through the transceiver (s) 430 and/or information to be sent to the transceiver (s) 430 for transmission through the antenna(s) 435. The processor 405 may handle, alone or in connection with the communications manager 420, various aspects of communicating over the unlicensed radio frequency spectrum band.

The transceiver (s) 430 may include a modem configured to modulate packets and provide the modulated packets to the antenna(s) 435 for transmission, and to demodulate packets received from the antenna(s) 435. The transceiver(s) 430 may in some cases be implemented as one or more transmitters and one or more separate receivers. The transceiver(s) 430 may support communications in the first radio frequency spectrum band and/or the second radio frequency spectrum band. The transceiver(s) 430 may be configured to communicate bi-directionally, via the antenna(s) 435, with the base station(s) described with reference to FIG. 1. While the UE 115-*e* may include a single antenna 435, there may be implementations in which the UE 115-*e* may include multiple antennas 435.

The communications manager 420 may be configured to perform and/or control some or all of the features and/or functions described with reference to FIGS. 1, 2A, 2B, 2C, 3A, 3B, 3C and/or 3D related to wireless communication in an unlicensed or shared radio frequency spectrum band. For example, communications manager 420 may be configured to implement an interference management scheme for the unlicensed spectrum to support communications or the apparatus 115-*e* and/or other communications of the network 100. The communications manager 420 may be configured to control the CTS signal generator 425 to provide desired CTS signals to the transceiver(s) 430 for transmission. The communications manager 420 may be an example of various aspects of the communications manager 310, 310-*a*, 310-*b* and/or 310-*c* described with reference to FIGS. 3A, 3B, 3C and/or 3D. The communications manager 420, or portions of it, may include a processor, and/or some or all of the functionality of the communications manager 420 may be performed by the processor 405 and/or in connection with the processor 405.

Figure 5:
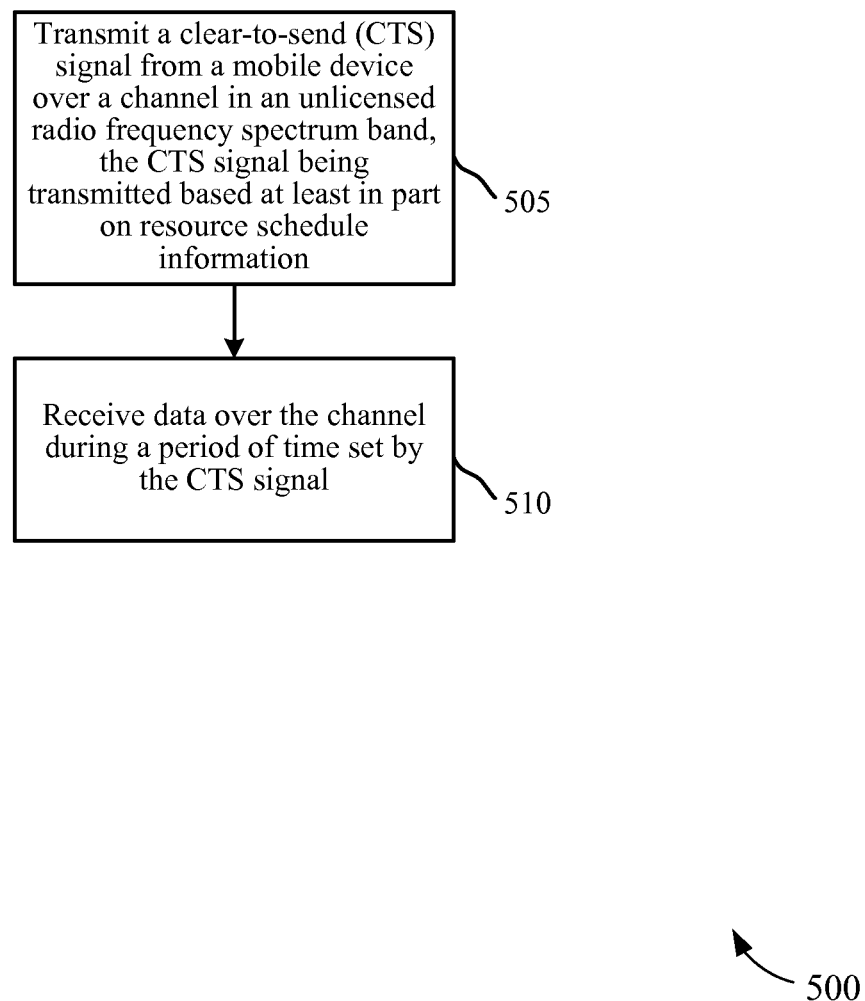
FIG. 5 is a flowchart illustrating an example of a method for wireless communication in an unlicensed spectrum, in accordance with various aspects of the present disclosure.

FIG. 5 is a flowchart illustrating an example of a method 500 for wireless communication in an unlicensed spectrum, in accordance with various aspects of the present disclosure. For clarity, the method 500 is described below with reference to aspects of the UEs 115 described with reference to FIG. 1, and/or the apparatuses 115-*a*, 115-*b*, 115-*c*, 115-*d* and/or 115-*e* described with reference to FIGS. 3A, 3B, 3C, 3D and/or 4. In some implementations, such an apparatus or UE may execute one or more sets of codes to control the functional elements of the apparatus or UE to perform the functions described below.

At block 505, a CTS signal is transmitted from a mobile device over a channel in an unlicensed radio frequency spectrum band. The CTS signal may be transmitted based at least in part on resource schedule information. For example, the resource schedule information may include scheduling for data communications and/or scheduling for CTS signals.

At block 510, data may be received over the channel during a period of time set by the CTS signal. The CTS may include a time value that determines the period of time that other device refrain from transmitting over the channel. In some cases, the time value may be set based at least in part on the resource schedule information.

Figure 6:
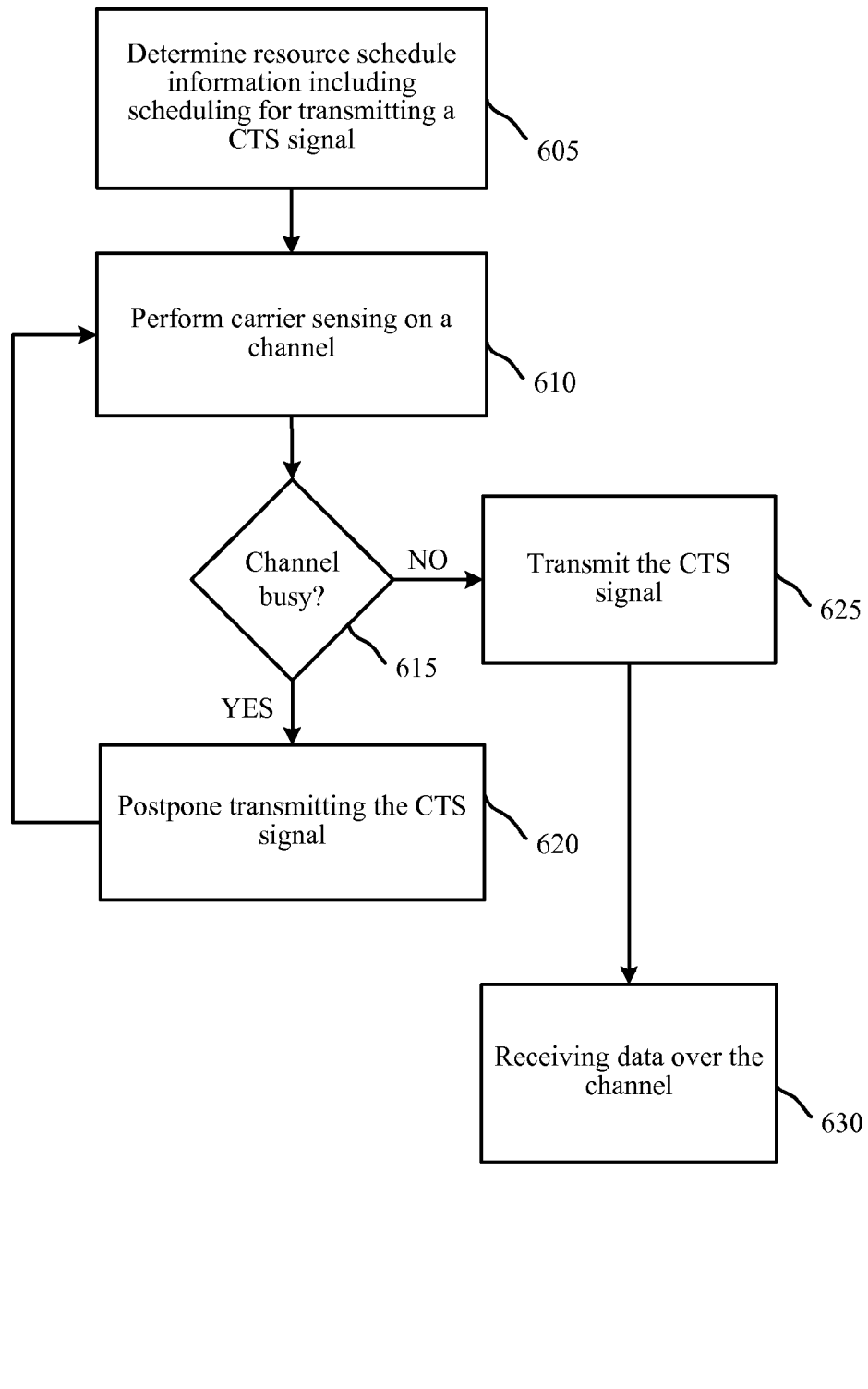
FIG. 6 is a flowchart illustrating another example of a method for wireless communication in an unlicensed spectrum, in accordance with various aspects of the present disclosure.

FIG. 6 is a flowchart illustrating another example of a method 600 for wireless communication in an unlicensed spectrum, in accordance with various aspects of the present disclosure. For clarity, the method 600 is described below with reference to aspects of the UEs 115 described with reference to FIG. 1, and/or the apparatuses 115-*a*, 115-*b*, 115-*c*, 115-*d* and/or 115-*e* described with reference to FIGS. 3A, 3B, 3C, 3D and/or 4. In some implementations, such an apparatus or UE may execute one or more sets of codes to control the functional elements of the apparatus or UE to perform the functions described below.

At block 605, resource schedule information including scheduling for transmitting a CTS signal may be determined. For example, resource schedule information may be received from another device of the wireless communication system 100, such as a base station 105 including a resource scheduler. When a data communication is scheduled on a channel according to the resource schedule information, carrier sensing may be performed on the channel at block 610.

Next, at block 615, a determination may be made as to whether the channel is busy based on the carrier sensing. If the channel is busy, the method may continue to block 620, at which transmitting the CTS signal may be postponed. The method may then return to block 610 to perform further carrier sensing on the channel. This may help to avoid over-blocking the channel with the CTS signal.

If the channel is not busy (e.g., idle or below a certain traffic threshold), the method may jump to block 625, at which the CTS signal may be transmitted. The method may then continue to block 630, at which data may be received over the channel. Thus, the data may be received while being protected from interference by the CTS signal.

Figure 7:
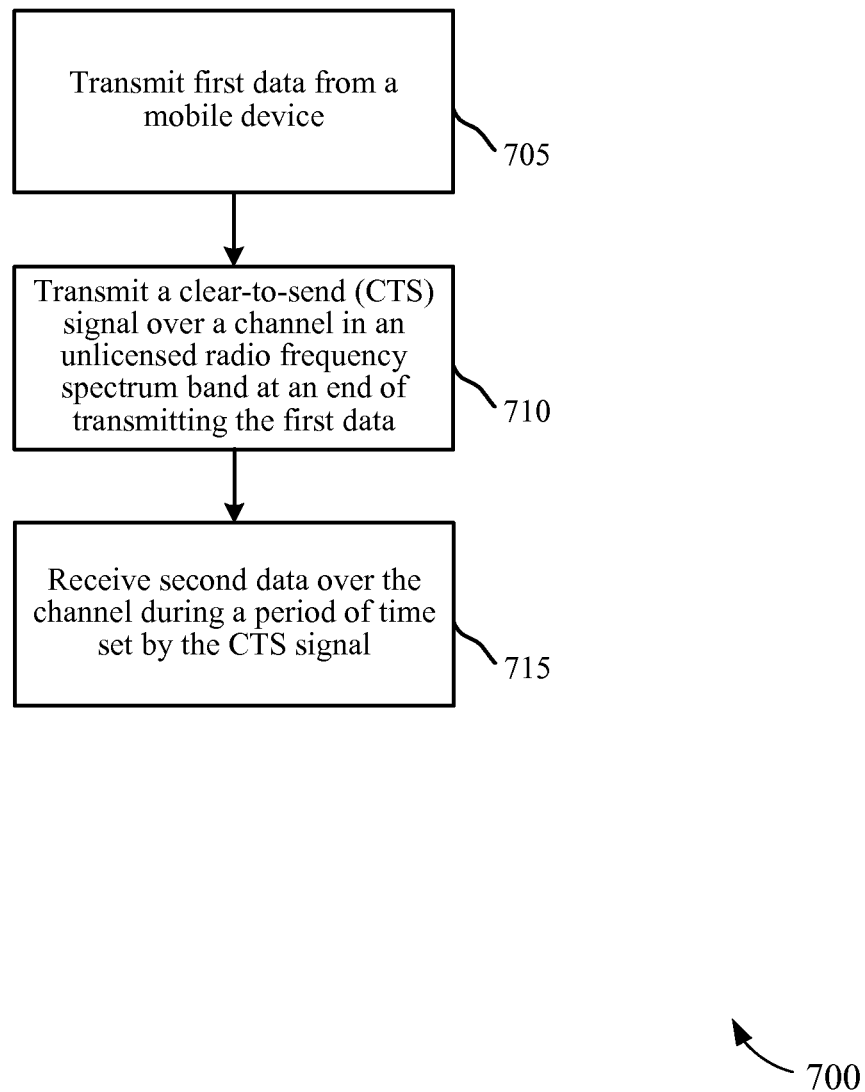
FIG. 7 is a flowchart illustrating yet another example of a method for wireless communication in an unlicensed spectrum, in accordance with various aspects of the present disclosure.

FIG. 7 is a flowchart illustrating yet another example of a method 700 for wireless communication in an unlicensed spectrum, in accordance with various aspects of the present disclosure. For clarity, the method 700 is described below with reference to aspects of the UEs 115 described with reference to FIG. 1, and/or the apparatuses 115-*a*, 115-*b*, 115-*c*, 115-*d* and/or 115-*e* described with reference to FIGS. 3A, 3B, 3C, 3D and/or 4. In some implementations, such an apparatus or UE may execute one or more sets of codes to control the functional elements of the apparatus or UE to perform the functions described below.

At block 705, first data may be transmitted from a mobile device. Then, at block 710, a CTS signal may be transmitted over a channel in an unlicensed radio frequency spectrum band at an end of transmitting the first data. In some cases, the data may be transmitted over the same channel.

Once the CTS signal has been transmitted, second data may be received over the channel during a period of time set by the CTS signal, at block 715. Thus, the second data may be received while being protected from interference by the CTS signal. In some cases, such as with communications over a wireless backhaul, the first data (transmission and/or reception) may be protected by another CTS signal transmitted at the end of a prior transmission of data over the channel.

Figure 8:
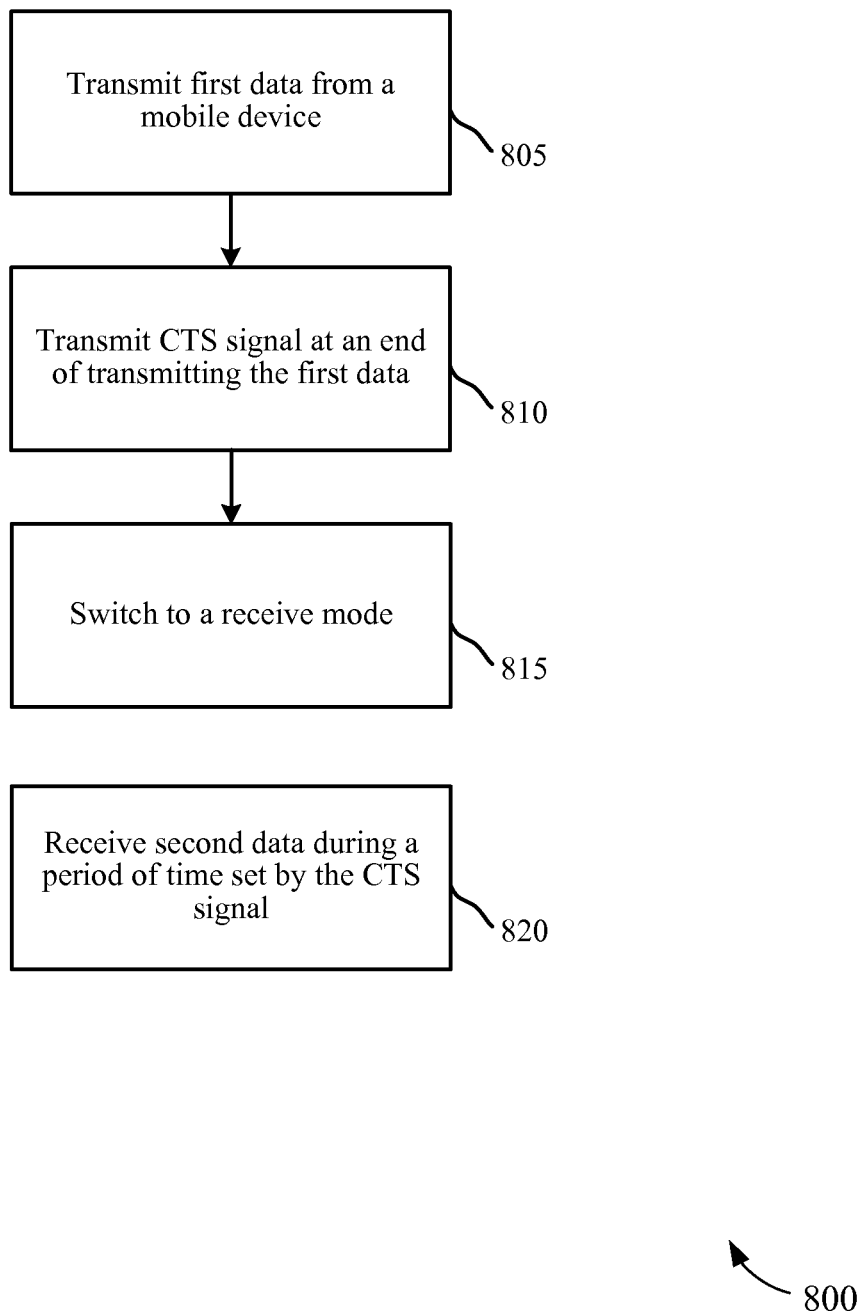
FIG. 8 is a flowchart illustrating still another example of a method for wireless communication in an unlicensed spectrum, in accordance with various aspects of the present disclosure.

FIG. 8 is a flowchart illustrating still another example of a method 800 for wireless communication in an unlicensed spectrum, in accordance with various aspects of the present disclosure. For clarity, the method 800 is described below with reference to aspects of the UEs 115 described with reference to FIG. 1, and/or the apparatuses 115-a, 115-b, 115-c, 115-d and/or 115-e described with reference to FIGS. 3A, 3B, 3C, 3D and/or 4. In some implementations, such an apparatus or UE may execute one or more sets of codes to control the functional elements of the apparatus or UE to perform the functions described below.

At block 805, first data may be transmitted from a mobile device. Then, at block 810, a CTS signal may be transmitted (e.g., over a channel in an unlicensed radio frequency spectrum band) at an end of transmitting the first data. In some cases, the data may be transmitted over the same channel.

After the CTS signal has been transmitted, the transmitting device may switch to a receive mode at block 815. Then, the device may receive second data during a period of time set by the CTS signal, at block 820. Thus, the CTS signal may be transmitted at the end of a transmission and before the device switches to the receive mode.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communications, comprising:
   transmitting a clear-to-send (CTS) signal from a mobile device over a channel in an unlicensed radio frequency spectrum band, the transmitting of the CTS signal being based at least in part on resource schedule information transmitted in the unlicensed frequency spectrum band, the CTS signal being transmitted after transmitting an information portion comprising a shortened frame;
   transmitting, after transmitting the CTS signal, a full frame comprising information different from the information portion; and
   receiving data over the channel during a period of time set by the CTS signal.

2. The method of claim 1, further comprising:
   receiving the resource schedule information, the resource schedule information including scheduling for transmitting the CTS signal.

3. The method of claim 2, wherein the resource schedule information includes scheduling for transmitting another CTS signal by at least one other mobile device.

4. The method of claim 2, wherein the scheduling for transmitting the CTS signal is quasi-static.

5. The method of claim 2, wherein the scheduling for transmitting the CTS signal is dynamic.

6. The method of claim 1, wherein transmitting the CTS signal comprises:
   transmitting the CTS signal according to a duty cycle.

7. The method of claim 1, further comprising:
   performing carrier sensing on the channel, the carrier sensing indicating that the channel is busy; and
   postponing transmitting the CTS signal until the carrier sensing indicates that the channel is idle.

8. The method of claim 1, further comprising:
   operating the mobile device in a synchronous system, wherein the CTS signal is configured to control WiFi interference.

9. The method of claim 1, wherein the data is received over a backhaul link.

10. The method of claim 1, further comprising:
    receiving a first CTS signal according to the resource schedule information, wherein transmitting the CTS signal comprises transmitting a second CTS signal in response to receiving the first CTS signal.

11. The method of claim 1, further comprising:
    setting a time value of the CTS signal based at least in part on the resource schedule information.

12. An apparatus for wireless communications, comprising:
    means for transmitting a clear-to-send (CTS) signal from a mobile device over a channel in an unlicensed radio frequency spectrum band, the transmitting of the CTS signal being based at least in part on resource schedule information transmitted in the unlicensed frequency spectrum band, the CTS signal being transmitted after transmitting an information portion comprising a shortened frame;
    means for transmitting, after transmitting the CTS signal, a full frame comprising information different from the information portion; and
    means for receiving data over the channel during a period of time set by the CTS signal.

13. The apparatus of claim 12, further comprising:
    means for receiving the resource schedule information, the resource schedule information including scheduling for transmitting the CTS signal.

14. The apparatus of claim 12, wherein the means for transmitting the CTS signal is configured to transmit the CTS signal according to a duty cycle.

15. The apparatus of claim 12, further comprising:
    means for performing carrier sensing on the channel, the carrier sensing indicating that the channel is busy; and
    means for postponing transmitting the CTS signal until the carrier sensing indicates that the channel is idle.

16. The apparatus of claim 12, further comprising:
    means for operating the mobile device in a synchronous system, wherein the CTS signal is configured to control WiFi interference.

17. The apparatus of claim 12, wherein the data is received over a backhaul link.

18. The apparatus of claim 12, further comprising:
    means for receiving a first CTS signal according to the resource schedule information, wherein the means for transmitting the CTS signal is configured to transmit the CTS signal in response to receiving the first CTS signal.

19. The apparatus of claim 12, further comprising:
    means for setting a time value of the CTS signal based at least in part on the resource schedule information.

20. An apparatus for wireless communication, comprising:
    a processor;
    memory in electronic communication with the processor; and
    instructions stored in the memory, the instructions being executable by the processor to:
    transmit a clear-to-send (CTS) signal from a mobile device over a channel in an unlicensed radio frequency spectrum band, the transmitting of the CTS signal being based at least in part on resource schedule information transmitted in the unlicensed frequency spectrum band, the CTS signal being transmitted after transmitting an information portion comprising a shortened frame;
    transmit, after transmitting the CTS signal, a full frame comprising information different from the information portion; and
    receive data over the channel during a period of time set by the CTS signal.

21. The apparatus of claim 20, wherein the instructions are executable by the processor to:
    receive the resource schedule information, the resource schedule information including scheduling for transmitting the CTS signal.

22. The apparatus of claim 20, wherein the instructions are executable by the processor to:
    transmit the CTS signal according to a duty cycle.

23. The apparatus of claim 20, wherein the instructions are executable by the processor to:
    perform carrier sensing on the channel, the carrier sensing indicating that the channel is busy; and
    postpone transmitting the CTS signal until the carrier sensing indicates that the channel is idle.

24. The apparatus of claim 20, wherein the instructions are executable by the processor to:
    operate the mobile device in a synchronous system, wherein the CTS signal is configured to control WiFi interference.

25. The apparatus of claim 20, wherein the instructions are executable by the processor to:

receive a first CTS signal according to the resource schedule information, wherein transmitting the CTS signal comprises transmitting a second CTS signal in response to receiving the first CTS signal.

26. The apparatus of claim 20, wherein the instructions are executable by the processor to:

set a time value of the CTS signal based at least in part on the resource schedule information.

27. A method of wireless communications, comprising:

transmitting first data from a mobile device;

transmitting a clear-to-send (CTS) signal from a mobile device over a channel in an unlicensed radio frequency spectrum band, the transmitting of the CTS signal being based at least in part on resource schedule information transmitted in the unlicensed frequency spectrum band, the CTS signal being transmitted after transmitting an information portion comprising a shortened frame;

transmitting, after transmitting the CTS signal, a full frame comprising information different from the information portion; and receiving second data over the channel during a period of time set by the CTS signal.

28. The method of claim 27, wherein the CTS signal is transmitted before the mobile device switches to a receive mode.

29. The method of claim 27, wherein transmitting the CTS signal comprises:

transmitting the CTS signal according to a duty cycle.

* * * * *